United States Patent
Carlson et al.

(10) Patent No.: US 10,298,327 B1
(45) Date of Patent: May 21, 2019

(54) POINTING CONTROL WITH FIBER NUTATION

(71) Applicant: BAE Systems Information and Electronic Systems Integration Inc., Nashua, NH (US)

(72) Inventors: Robert T Carlson, Bedford, NH (US); Clifford D Caseley, Hudson, NH (US); David A. Haessig, Jr., Towaco, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/003,690

(22) Filed: Jun. 8, 2018

(51) Int. Cl.
| | |
|---|---|
| *H04B 10/11* | (2013.01) |
| *H04B 10/25* | (2013.01) |
| *H04B 10/29* | (2013.01) |
| *H04B 10/60* | (2013.01) |
| *H04B 10/50* | (2013.01) |
| *H04B 10/40* | (2013.01) |

(52) U.S. Cl.
CPC ............. *H04B 10/25* (2013.01); *H04B 10/11* (2013.01); *H04B 10/29* (2013.01); *H04B 10/503* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 4,227,077 | A * | 10/1980 | Hopson | F41G 7/2213 244/3.16 |
| 7,860,344 | B1 * | 12/2010 | Fitzpatrick | G06K 9/3241 345/419 |
| 2009/0324236 | A1 * | 12/2009 | Wu | H04B 10/118 398/122 |
| 2014/0021329 | A1 * | 1/2014 | Spickermann | G02B 26/0816 250/201.1 |

* cited by examiner

*Primary Examiner* — Darren E Wolf
(74) *Attorney, Agent, or Firm* — Maine Cernota & Rardin

(57) ABSTRACT

A nutation controller and methods of use correct for the small, fixed offset inherent in laser communication systems referred to as pointing bias error, thereby removing the pointing bias error and allowing for more robust and rapid laser communications between distant platforms.

19 Claims, 4 Drawing Sheets

POINTING CONTROL WITH FIBER NUTATION

FIELD

The disclosure relates to wireless telecommunications, and more particularly, to nutation methods and devices that enable robust wireless laser communications.

BACKGROUND

Due to an explosion in both civilian and military wireless communication, there is a growing need for high speed, reliable, secure, wireless communication of large amounts of data between communicating nodes. It should be noted that the term "wireless" is used throughout this disclosure to refer to any communication that does not depend on a physical link between sender and receiver. Hence, the term "wireless", as used herein, excludes fiber optic communication as well as communication over copper wires.

Traditional communication by wireless radio frequencies suffers from several shortcomings, many of which arise from the wide geographic dispersion of typical radio emissions (e.g. side lobes). Even when directional antennae and antenna arrays are used, radio signals are generally disbursed over large geographic areas, causing rapid attenuation of the signal strengths with distance, and also causing the signals to be relatively easy to intercept by unintended receivers. Due to the geographic overlap of radio communication signals, it is typically necessary to assign radio transmissions to specific frequency bands, which are often in limited supply. Furthermore, it is relatively easy for hostile antagonists to attempt to jam radio communications by transmitting radio signals at high energies that blanket a region of interest.

There are several approaches that attempt to address these problems of wireless radio communications. For example, bandwidth restrictions can be mitigated by opportunistically seeking and using bands that are nominally assigned to other uses, but are not currently in use. Various time and coding schemes can be employed to allow more than one communication link to share the same frequency band. So-called "multi-user" detection can also be employed to further distinguish signals transmitted on overlapping frequencies. The geographic range of wireless signals may also be extended by implementing signal relay nodes within a region of interest.

Security of wireless radio communications can be improved, for example, by employing secure transmission methods such as frequency "hopping," by adding pseudo-noise to communications, and by encoding communications with sophisticated, virtually impregnable cyphers. The Link 16 protocol is an example of this approach.

Nevertheless, all of these approaches to radio communication include significant disadvantages, such as increased cost and complexity, and message processing overhead that can slow communication and limit data transfer speeds.

Given these limitations, laser communication, or "laser-com," offers an attractive wireless alternative to radio communication, especially when point-to-point communication is required. Notably, the non-dispersed, focused character of laser communication intrinsically avoids most of the problems that are associated with radio communication. In particular, there is no need to assign frequency bands to laser-com users, because interference between laser signal beams is avoided so long as two beams are not directed to the same recipient. Laser signals experience very little attenuation as a function of distance, because the signal energy remains tightly focused in a beam. Communication security is also intrinsically high, as the interception of and interference with laser communications requires direct interception of a laser communication beam and/or focusing jamming beams directly at an intended signal receiver.

One important application that can benefit significantly from laser-com is satellite communications, where line-of-sight access is generally available, and where the communication distances are very great. Laser-com can provide communication data rates for satellites that are much higher than radio data rates, with unmatched anti-jam characteristics and an inherently low risk of communications intercept. Laser-com also eliminates the need for frequency planning and authorization, and circumvents the highly congested RF spectrum bandwidth constraints that limit the practical data rates available to users of RF links.

With reference to FIG. 1, laser communications holds great promise for multi-Gbps (Giga-bits per second) connections between space platforms 100, as well as between ground-based nodes 102 and space platforms 100, owing to the availability of efficient, multi-watt laser sources and exceedingly high antenna gain, having beam widths of only 10-20 micro-radians and telescope apertures that are only four to eight inches in diameter. Even when much lower data rates of tens to hundreds of mega-bits per second (Mbps) are of interest, laser-com may be desirable due to its inherent Low Probability of Intercept (LPI), Low Probability of Detection (LPD), and anti-jam characteristics.

It should be noted that the disclosure herein is mainly presented with reference to satellite communication. However, it will be understood by those of skill in the art that the present disclosure is not limited to satellite communication, but also applies to other implementations of laser communication.

Of course, there are certain problems associated with laser communication that arise specifically from the focused nature of laser beams. In particular, it is necessary for communicating nodes to identify each other and align their lasers so as to effectively communicate. In the case of satellite laser-com, these identification and alignment problems are especially acute, because laser sources that are well separated by terrestrial standards, for example several miles apart from each other, may nevertheless appear to be almost geographically overlapping from the viewpoint of a satellite. Furthermore, thermal and other atmospheric effects can lead to both frequency (wave length) and angular (apparent location) shifting of an incident laser communication beam, even after it is identified and aligned. The angular vibrational effects, together with other short-term mechanical instabilities of the satellite or other receiving node, are referred to herein collectively as "jitter."

With reference to FIG. 2, there are at least four steps to establish and maintain laser communications. First, a candidate light source, referred to herein as a "hot spot," is identified from within a scene of interest 200. Second, the hot spot is verified as being a communication signal and its transmission source is identified so as to determine if it is a signal of interest 202. Third, the optics of the laser-com receiving system is aligned with the incoming beam 204. Finally, once communication has been established, the beam is tracked during communication so that the alignment is maintained and the communication is not interrupted 206.

The present disclosure is mostly directed to the fourth 206 of the steps of FIG. 2, wherein there is a need for a more rapid and reliable apparatus and method for maintaining a laser communication ("laser-com") signal within a center of band while avoiding corruption from other signals.

SUMMARY

Methods and related devices are herein disclosed for processing time variation in laser signal power during nutation of a receive fiber, which is configured to accept a transmitted laser communications signal, allowing for more rapid and reliable maintenance of laser communications.

In embodiments, an algorithm processes received laser signal power to estimate with zero mean error a fixed offset error present in the laser pointing direction. Once estimated, the error is removed, thereby removing the associated received signal power loss and improving both the speed and quality of communications over the link.

The methods and devices disclosed herein are able to detect and estimate bias errors using control techniques that make residual bias errors of interest observable; observability enables the error to be estimated and/or measured. As a result, the error can be rejected by a control actuator. Embodiments of the estimation and control methods disclosed herein have sufficiently small computational requirements that they can be readily realized within the computational hardware resources present in Field Programmable Gate Arrays (FPGAs) and Application-Specific Integrated-Circuits (ASICs).

One embodiment of the present disclosure provides a laser communications system, the system comprising: a laser-signal receiving module comprising an optical fiber having a proximal, laser-light receiving end, and a distal, laser-light transmitting end; a power-in-fiber light sensor in optical communication with the distal end of said optical fiber; a nutator configured to nutate incoming light onto the proximal end of said optical fiber; and a nutation controller in operative communication with said nutator, wherein said nutation controller is configured to cause said nutator to nutate incoming light onto the proximal end of said optical fiber or the proximal end of said optical fiber itself to maximize the strength of a laser communications signal incident thereon by correcting for pointing bias errors.

Another embodiment of the present disclosure provides such a system wherein said nutation controller is used to control nutation in the on-elevation axis.

A further embodiment of the present disclosure provides such a system wherein separate and independent nutation controllers are utilized on each axis on which unwanted motion is present.

Yet another embodiment of the present disclosure provides such a system wherein a first nutation controller is used to control nutation in the elevation axis and a second nutation controller is used to control nutation in the cross-elevation axis.

A yet further embodiment of the present disclosure provides such a system wherein said nutator is a fast steering mirror.

Still another embodiment of the present disclosure provides such a system wherein the fast steering mirror comprises a fast steering mirror control system that receives a commanded mirror angle.

A still further embodiment of the present disclosure provides such a system wherein the commanded mirror angle is a blended control signal derived from inputs from a base inertial controller and said nutation controller.

Even another embodiment of the present disclosure provides such a system wherein said base inertial controller is an angular rate sensor.

An even further embodiment of the present disclosure provides such a system wherein said nutation controller is configured to receive at least two inputs, a displacement angle ($\phi_N$) and an output signal from the power-in-fiber light sensor that corresponds to the strength of a laser signal incident on the proximal end of said optical fiber.

A still even another embodiment of the present disclosure provides such a system wherein said nutation controller also produces an output ($u_N$) that drives a fast steering mirror such that the angle of the mirror relative to the base cancels the base angle ($\theta_B$), resulting in a line-of-sight (LOS) angle ($\theta_L$) of zero.

A still even further embodiment of the present disclosure provides such a system 9 wherein:

$$u_N = -\frac{\hat{\theta}_B}{2}.$$

Still yet another embodiment of the present disclosure provides such a system wherein:

$$u_N = -\frac{\hat{\theta}_B}{2}$$

for the elevation axis and $$u_N = -\frac{\hat{\theta}_B}{\sqrt{2}}$$

for the cross elevation axis.

A still yet further embodiment of the present disclosure provides such a system further comprising a nonlinear filter configured to process the output signal from the power-in-fiber light sensor to derive ($\hat{\theta}_B$).

Even yet another embodiment of the present disclosure provides such a system wherein said non-linear filter is configured to demodulate the power-in-fiber signal using a mixing signal equal to the nutation angular motion, bringing the signal around the nutation frequency to zero, and, subsequently, filter the resulting signal to remove noise from the sensor output and generate an estimate of the base angle state ($\hat{\theta}_B$).

An even yet further embodiment of the present disclosure provides such a system wherein said non-linear filter is selected from the group consisting of Unscented Kalman Filters, Particle Filters, and State Dependent Differential Riccati Equation Filters, wherein said non-linear filter is configured to capture motion corresponding to a base input and model power-in-fiber light sensor output voltage as a function of angle.

Still even yet another embodiment of the present disclosure provides such a system wherein said non-linear filter is an Extended Kalman Filter configured to capture motion corresponding to a base input and model power-in-fiber light sensor output voltage as a function of angle.

A still even yet further embodiment of the present disclosure provides such a system wherein said non-linear filter is configured to capture motion corresponding to a base input and model power-in-fiber light sensor output voltage as a function of angle.

Yet still even another embodiment of the present disclosure provides such a system wherein equations used by the non-linear filter comprise:

$$\dot{P}=AP+PA'-PH'V^{-1}HP+W$$

$$K=PH'V^{-1}$$

$$\dot{\hat{x}}=A\hat{x}+K(x-h(\hat{x},t))$$

with $$x = \begin{bmatrix} \omega_B \\ \theta_B \end{bmatrix} \quad A = \begin{bmatrix} -\Omega_C & 0 \\ 1 & 0 \end{bmatrix}$$

A yet still even further embodiment of the present disclosure provides such a system wherein said nutation controller is configured to cause said nutator to move the proximal end of said optical fiber in a circular pattern that causes the nutation angle on each axis to vary sinusoidally in accordance with the following:

$$\phi_{NE}(t)=A_N \cos(2\pi f_N t) \text{ on the elevation axis}$$

$$\phi_{NX}(t)=A_N \sin(2\pi f_N t) \text{ on the cross-elevation axis}$$

One embodiment of the present disclosure provides a laser communications system, the system comprising: a laser-signal receiving module comprising an optical fiber having a proximal, laser-light receiving end, and a distal, laser-light transmitting end; a power-in-fiber light sensor in optical communication with the distal end of said optical fiber; a nutator configured to nutate incoming light onto the proximal end of said optical fiber; a nutation controller in operative communication with said nutator; and a nonlinear filter configured to process an output signal from the power-in-fiber light sensor, wherein said nutation controller is configured to cause said nutator to nutate incoming light onto the proximal end of said optical fiber or the proximal end of said optical fiber itself to maximize the strength of a laser communications signal incident thereon by correcting for pointing bias errors, and wherein said nutation controller is configured to utilize a nutator displacement angle as a persistent external excitation.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
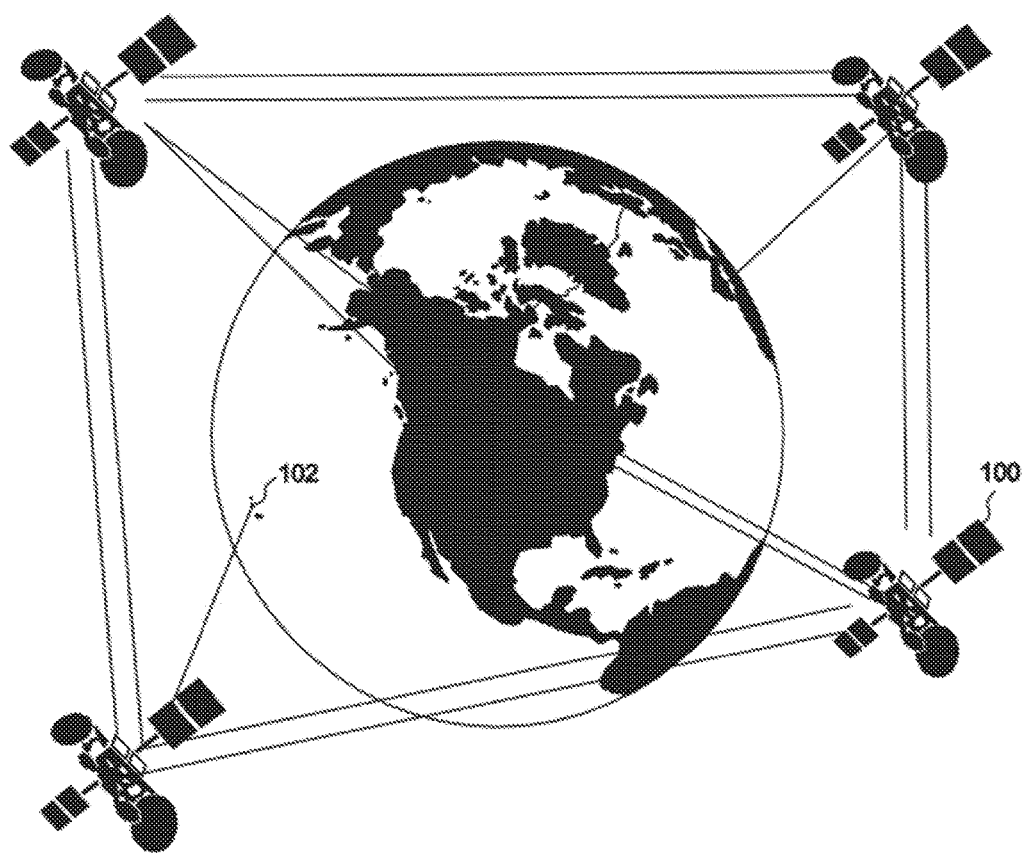
FIG. 1 illustrates laser-com communication between orbiting satellites, and between the satellites and ground-based nodes.
Figure 2:
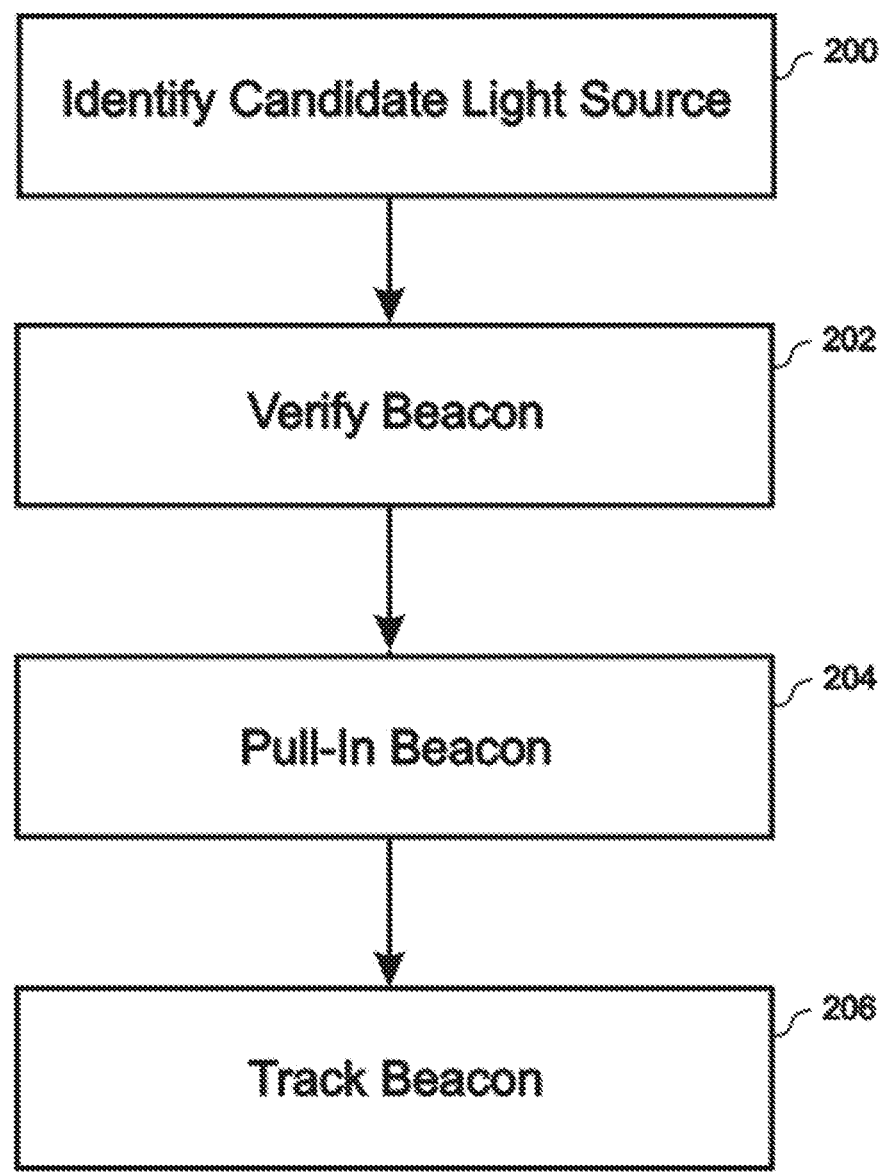
FIG. 2 is a flow diagram illustrating steps required for aligning a laser-com receiving system with a transmitting node.

As a preliminary matter, nutation, from the Latin nūtātiō, "nodding, swaying", is used herein to describe a rocking, swaying, or nodding motion in the axis of rotation of a largely axially symmetric object, such as a gyroscope, planet, or bullet in flight, or as an intended behavior of a mechanism. In the context of the present disclosure, to nutate refers to moving in a roughly circular trajectory about a center point.

When pointing a communication laser from a transmitting platform to a receiving platform, e.g. from a satellite to a ground-based telescope acting as a receiver, or vice-versa, the control approach typically involves an inertial stabilization capability that mitigates the effects of platform angular disturbances on the laser's pointing direction, relative to a null location. This null location, however, contains a small, fixed offset, which is often described as a misalignment that is defined by the center of an optical fiber used to receive the signal relative to the center of the coarse acquisition sensor, which may be a quad-cell (i.e. 4 pixels arranged in a square pattern). This small, fixed offset, which is herein referred to as a pointing bias error, introduces a loss in the mean signal power received, degrading the achievable link range and throughput. The devices and methods disclosed herein address this issue, allowing for more rapid and reliable maintenance of laser communications with higher throughput, relative to prior art devices and methods.

More specifically, a nutation controller 300 and methods of use that correct for this small, fixed offset, thereby removing the pointing bias error, are disclosed herein. Embodiments of the present disclosure also allow for the rejection of base motion input at lower frequencies than is possible using current state of the art designs (i.e. 10 Hz and below) and successful operation even when subjected to scintillation, i.e. flashes or sparkles of light.

In addition to the above-noted problems, laser communications systems are also susceptible to angular vibrational motion, which tend to impose a jitter on any optical signal being processed by the system. This substantially random motion of the optical system is imparted to the laser, disturbing its pointing direction. In embodiments, this jitter, which may also be referred to herein as Line-of-Sight (LOS) jitter, is also reduced, relative to prior art systems and methods, when both scintillation and platform disturbance inputs are present.

In embodiments, a separate and independent nutation controller 300 is utilized on each axis on which unwanted motion is present. The nutation controller 300, in embodiments, is configured control a nutation device, or nutator (e.g. FSM 302), and cause it to nutate a received laser signal about a power in fiber, which is configured to relay received light to the remainder of the system. By nutating the light about the power in fiber and carefully measuring the variation in received light, the pointing bias error may be measured and, subsequently, accounted for. In exemplary embodiments, there are two axis on which unwanted motion is accounted for, although more axis could be accommodated by the teachings provided herein, as would be understood to one of ordinary skill in the art. These axis are referred to herein as the 'Elevation' and 'Cross-Elevation' axis, which may also be referred to as the EL and X-EL axis, respectively. In embodiments, corresponding 'Elevation' and 'Cross-Elevation' nutation controllers are used to correct for unwanted motion on the elevation and cross-elevation axis, respectively. In embodiments, the nutation controller(s) 300 are in operative communication with a Fast Steering Mirror (FSM) 302, which acts as a nutator, that is configured to direct and nutate an incoming laser communications signal onto a receive, or power in, fiber configured to receive laser communications.

Figure 3:
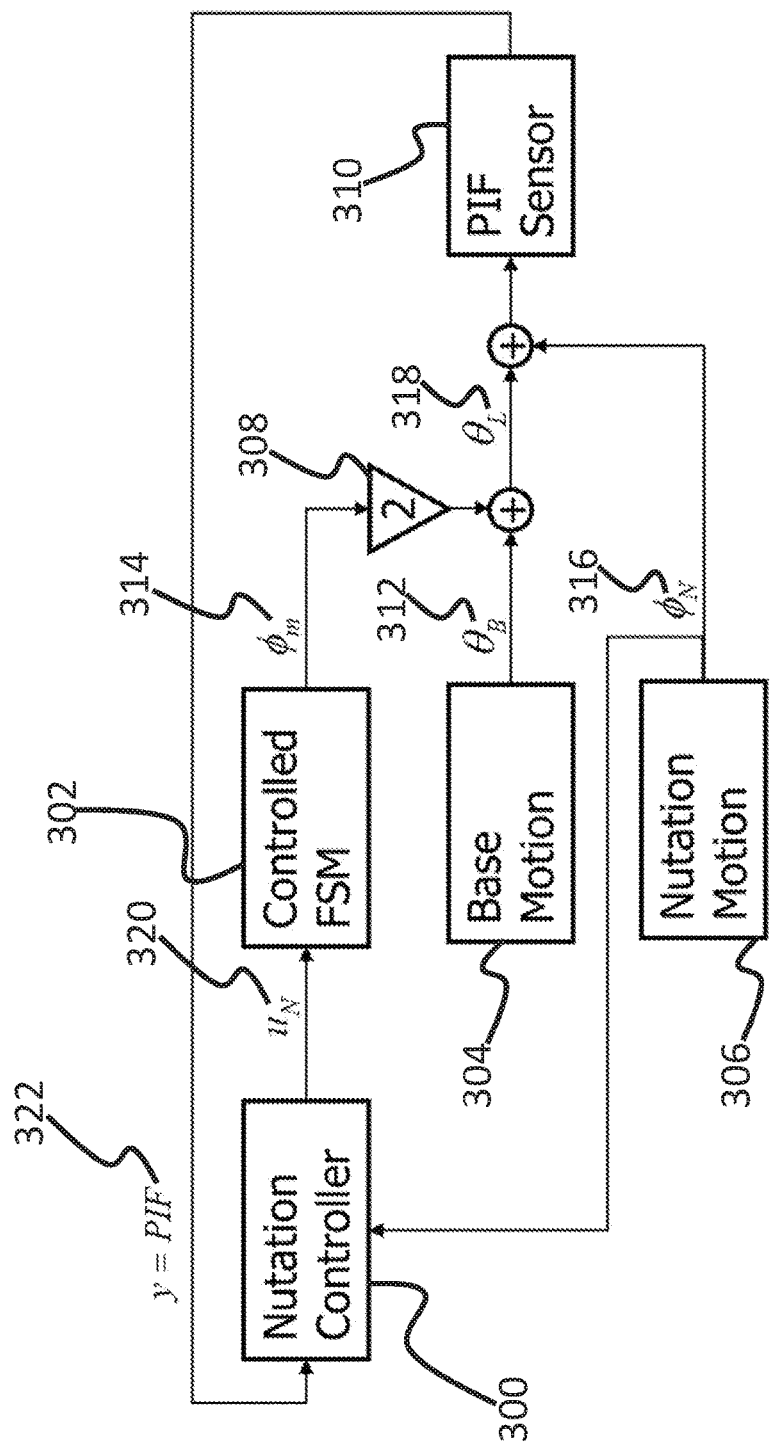
FIG. 3 is a simulation block diagram showing a single-axis nutation method in accordance with embodiments of the present disclosure.

In general, base motion 304 is less on the cross-elevation axis, while scintillation remains the same as for the elevation axis, resulting in the performance of the nutation controller 300 about the cross-elevation axis generally being better than that described herein for the elevation axis, which may also be referred to as the "On-Elevation" axis. In embodiments, the nutation control 300 and associated methods are used only on the on-elevation axis. A single-axis nutation controller 300 block diagram showing the interaction of the nutation controller 300 with other components of a laser communications system is provided in FIG. 3. It should be noted that while FIG. 3 provides an optical scaling factor 308 of '2', this number is used only in embodiments and may be adjusted to account for different situations. In embodiments, the optical scaling factor 308 is 2 for the elevation axis, and sqrt(2) for the cross elevation axis. In other embodiments, the optical scaling factor 308 is adjusted based on the effects of optical elements in the system.

Embodiments of the nutation controller 300 shown in FIG. 3 are configured to receive at least two inputs: a displacement angle $\phi_N$ 316 (the "nutator displacement angle") and an output signal 322 from a power-in-fiber (PIF) sensor 310, which serve as persistent external excitations that the nutation controller 300 uses to continually reduce pointing bias errors. In embodiments, the nutation controller 300 also produces an output $u_N$ 320 that drives an FSM 302 such that its output $\phi_m$ 314, the angle of the mirror relative to the base, will cancel the base angle $\theta_B$ 312, resulting in a line-of-sight (LOS) angle $\theta_L$ 318 of zero.

In embodiments, the FSM 302 is itself a separate control system actuator that receives a commanded FSM angle, which may be a blended control signal derived from a base inertial controller, such as an angular rate sensor (e.g. the ARS-14), and the nutation controller 300 described herein. This blended signal is then used to drive the mirror pickoff angle $\phi_m$ 314 to a set point. A commanded angle 320 associated with the nutation control 300, in embodiments, is developed given a base, or platform, angle $\theta_B$ 312 as follows:

$$u_N = -\frac{\theta_B}{2}$$

The denominator, "2", used in the above equation is an optical scaling factor 308 and may be adjusted based on the effects of optical elements in the system. In embodiments, the optical scaling factor 308 is 2 for the elevation axis, and sqrt(2) for the cross elevation axis.

Since the FSM 302 output of embodiments tracks this command, then $\phi_m = \theta_B/2$ and the resulting inertial LOS angle 318 is held at zero. As the true base angle 312 is not known, in embodiments, an estimate of the base motion $\hat{\theta}_B$ 312 is developed and used to define the control law:

$$u_N = -\frac{\hat{\theta}_B}{2}$$

In embodiments, a nonlinear filter 400 is then used to process the PIF measurement to derive $\hat{\theta}_B$ 312. This filter demodulates the PIF signal 322 with a mixing signal equaling the nutation angular motion, bringing the signal around the nutation frequency to zero, and subsequently filters the resulting signal to remove noise (e.g. scintillation) from the sensor output and generate an estimate of the base angle state $\hat{\theta}_B$ 312.

Figure 4:
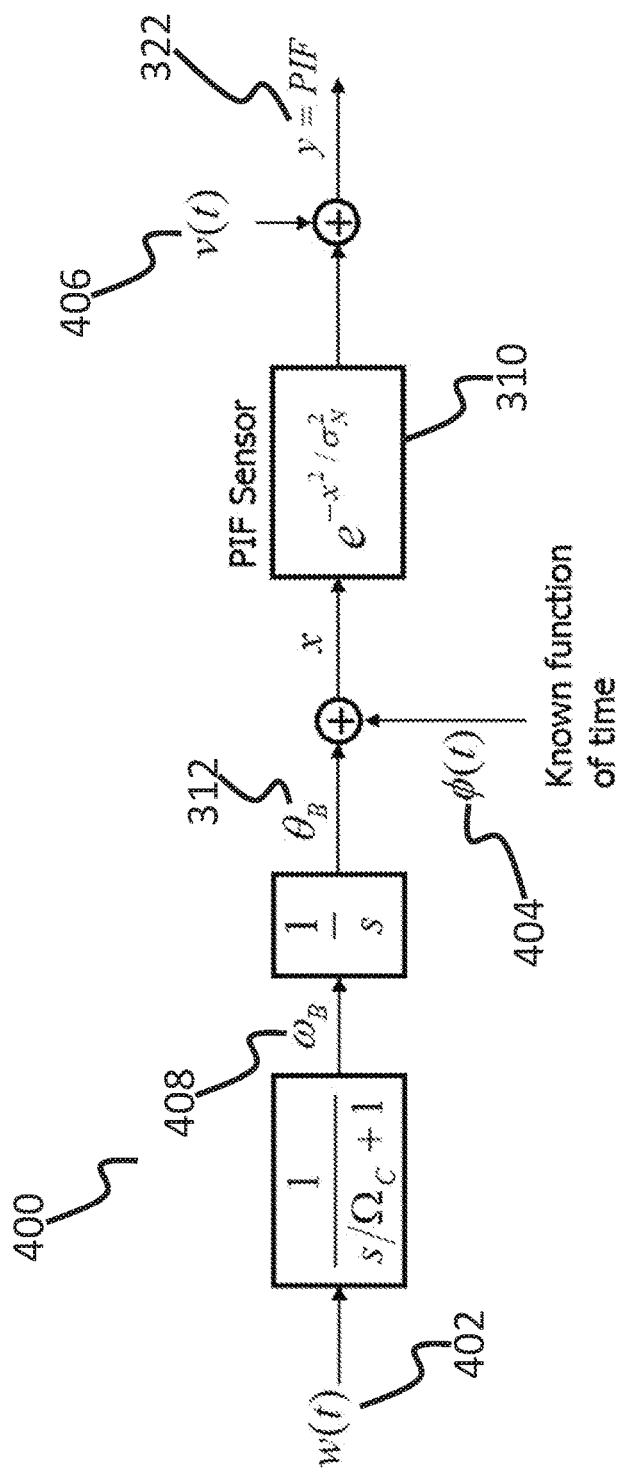
FIG. 4 is a nutation controller design model, in accordance with embodiments of the present disclosure.

The details of this filter 400, which, in embodiments, is an Extended Kalman Filter (EKF), are shown in FIG. 4, capturing the motion of the base input and a model of the PIF output voltage profile as a function of angle, a Gaussian function.

Now referring to FIG. 4, base input motion is represented as an integrator. First order lag is shown with a break frequency $\Omega_C$ at 10 Hz. The input process noise w(t) 402 and measurement noise v(t) 406 are not noise sources injected into the design, but represent noise sources that the filter 400 is told exist in the system. These noise levels are used in the generation of the filter that "optimally" estimates the states of the system—$\theta_B$ 312 and $\omega_B$ 408—given this model and measured y.

In embodiments, the LOS angle 318 that is the input to the PIF is x:

$$x = \theta_B + \phi_N(t) + 2\phi_m(t)$$

In these equations, base angle $\theta_B$ 312 is the unknown to be estimated, with the other terms being known. In embodiments, this known input $\phi(t) = \phi_N(t) + 2\phi_m(t)$, 404 is provided to the filter 400. In this equation, the nutation angular displacement $\phi_N(t)$ 316 is a known, as is the mirror angle $\phi_m(t)$ 314, which is measured. In embodiments, these values are fed into the nutation controller 300 substantially in real-time, to enable it to perform what is effectively a demodulation to baseband operation that additionally includes filtering.

A nutation drive, in embodiments, is then used to move the fiber in a substantially circular pattern that causes the nutation angle on each axis vary sinusoidally in accordance with the following:

$$\phi_{NE}(t) = A_N \cos(2\pi f_N t) \text{ on the elevation axis}$$

$$\phi_{NX}(t) = A_N \sin(2\pi f_N t) \text{ on the cross-elevation axis}$$

The EKF, in embodiments, is based on the state space model shown, in block diagram form, in FIG. 4, which is also reproduced below:

$$\begin{bmatrix} \dot{\omega}_B \\ \dot{\theta}_B \end{bmatrix} = \begin{bmatrix} -\Omega_C & 0 \\ 1 & 0 \end{bmatrix} \begin{bmatrix} \omega_B \\ \theta_B \end{bmatrix} + \begin{bmatrix} w_B \\ 0 \end{bmatrix}$$

$$y = h(x,t) + v(t) = \exp[-(\theta_B + \phi(t))^2 / \sigma_N^2] + v(t)$$

In embodiments, partial derivatives of state and observation nonlinearities are then derived. In embodiments, the state is linear and the observation is nonlinear, having partials:

$$H = \begin{bmatrix} \frac{\partial h(x,t)}{\partial \omega_B} & \frac{\partial h(x,t)}{\partial \theta_B} \end{bmatrix} = \begin{bmatrix} 0 & \frac{-2(\theta_B + \phi(t))}{\sigma_N^2} \exp[-(\theta_B + \phi(t))^2 / \sigma_N^2] \end{bmatrix}$$

The EKF equations implemented in embodiments of the controller are:

$$\dot{P} = AP + PA' - PH'V^{-1}HP + W$$

$$K = PH'V^{-1}$$

$$\dot{\hat{x}} = A\hat{x} + K(x - h(\hat{x}, t))$$

with $$x = \begin{bmatrix} \omega_B \\ \theta_B \end{bmatrix} \quad A = \begin{bmatrix} -\Omega_C & 0 \\ 1 & 0 \end{bmatrix}$$

Two parameters are selected in producing the filter design, the V and W matrices, which, in this case, each consist of a single scalar, the ratio of which defines the filter bandwidth. Thus, when evaluating a particular design, one matrix may be fixed while the other is varied to assess the impact of filter bandwidth on performance.

In addition to the foregoing use cases and embodiments, embodiments of the present disclosure also may be used for general video pointing control involving receive aperture nutation to observe and identify optimal pointing angles.

The foregoing description of the embodiments of the disclosure has been presented for the purposes of illustration and description. It is not intended to be exhaustive or to limit the disclosure to the precise form disclosed. Many modifications and variations are possible in light of this disclosure. It is intended that the scope of the disclosure be limited not by this detailed description, but rather by the claims appended hereto.

What is claimed is:

1. A laser communications system, the system comprising:
   a laser-signal receiving module comprising an optical fiber having a proximal end configured to receive laser-light and a distal end configured to transmit laser-light;
   a power-in-fiber light sensor in optical communication with the distal end of said optical fiber;
   a nutator configured to nutate incoming light onto the proximal end of said optical fiber; and
   at least one nutation controller in operative communication with said nutator,
   wherein said nutation controller is configured to receive at least two inputs, a nutator displacement angle ($\phi_N$) and an output signal from the power-in-fiber light sensor that corresponds to the strength of a laser signal incident on the proximal end of said optical fiber, and
   wherein said nutation controller is configured to cause said nutator to nutate incoming light onto the proximal end of said optical fiber or to nutate the proximal end of said optical fiber itself to maximize the strength of a laser communications signal incident thereon by correcting for pointing bias errors.

2. The system of claim 1 wherein said nutation controller is used to control nutation in the on-elevation axis.

3. The system of claim 1 wherein separate and independent nutation controllers are utilized on each axis on which unwanted motion is present.

4. The system of claim 1 wherein a first nutation controller is used to control nutation in the elevation axis and a second nutation controller is used to control nutation in the cross-elevation axis.

5. The system of claim 1 wherein said nutator is a fast steering mirror.

6. The system of claim 5 wherein the fast steering mirror comprises a fast steering mirror control system that receives a commanded mirror angle.

7. The system of claim 6 wherein the commanded mirror angle is a blended control signal derived from inputs from a base inertial controller and said nutation controller.

8. The system of claim 7 wherein said base inertial controller is an angular rate sensor.

9. The system of claim 1, wherein said nutation controller also produces an output ($u_N$) that drives a fast steering mirror such that the angle of the mirror relative to the base cancels the base angle ($\theta_B$), resulting in a line-of-sight (LOS) angle ($\theta_L$) of zero.

10. The system of claim 9 wherein:

$$u_N = -\frac{\hat{\theta}_B}{2}.$$

11. The system of claim 9 wherein:

$$u_N = -\frac{\hat{\theta}_B}{\sqrt{2}}$$

for the elevation axis and $$u_N = -\frac{\hat{\theta}_B}{2}$$

for the cross elevation axis.

12. The system of claim 9 further comprising a nonlinear filter configured to process the output signal from the power-in-fiber light sensor to derive ($\theta_B$).

13. The system of claim 12 wherein said non-linear filter is configured to demodulate the power-in-fiber signal using a mixing signal equal to the nutation angular motion, bringing the signal around the nutation frequency to zero, and, subsequently, filter the resulting signal to remove noise from the sensor output and generate an estimate of the base angle state ($\theta_B$).

14. The system of claim 12 wherein said non-linear filter is selected from the group consisting of Unscented Kalman Filters, Particle Filters, and State Dependent Differential Riccati Equation Filters, wherein said non-linear filter is configured to capture motion corresponding to a base input and model power-in-fiber light sensor output voltage as a function of angle.

15. The system of claim 12 wherein said non-linear filter is an Extended Kalman Filter configured to capture motion corresponding to a base input and model power-in-fiber light sensor output voltage as a function of angle.

16. The system of claim 12 wherein said non-linear filter is configured to capture motion corresponding to a base input and model power-in-fiber light sensor output voltage as a function of angle.

17. The system of claim 16 wherein equations used by the non-linear filter comprise:

$$\dot{P}=AP+PA'-PH'V^{-1}HP+W$$

$$K=PH'V^{-1}$$

$$\dot{\hat{x}}=A\hat{x}+K(x-h(\hat{x},t))$$

with $$x = \begin{bmatrix} \omega_B \\ \theta_B \end{bmatrix} \quad A = \begin{bmatrix} -\Omega_C & 0 \\ 1 & 0 \end{bmatrix}.$$

18. The system of claim 1 wherein said nutation controller is configured to cause said nutator to move the proximal end of said optical fiber in a circular pattern that causes the nutation displacement angle on each axis to vary sinusoidally in accordance with the following:

$$\phi_{NE}(t) = A_N \cos(2\pi f_N t) \text{ on the elevation axis}$$

$$\phi_{NX}(t) = A_N \sin(2\pi f_N t) \text{ on the cross-elevation axis.}$$

19. A laser communications system, the system comprising:
- a laser-signal receiving module comprising an optical fiber having a proximal end configured to receive laser-light and a distal end configured to transmit laser-light;
- a power-in-fiber light sensor in optical communication with the distal end of said optical fiber;
- a nutator configured to nutate incoming light onto the proximal end of said optical fiber;
- a nutation controller in operative communication with said nutator; and
- a nonlinear filter configured to process an output signal from the power-in-fiber light sensor,
- wherein said nutation controller is configured to receive at least two inputs, a nutator displacement angle ($\phi_N$) and an output signal from the power-in-fiber light sensor that corresponds to the strength of a laser signal incident on the proximal end of said optical fiber,
- wherein said nutation controller is configured to cause said nutator to nutate incoming light onto the proximal end of said optical fiber or to nutate the proximal end of said optical fiber itself to maximize the strength of a laser communications signal incident thereon by correcting for pointing bias errors, and
- wherein said nutation controller is configured to utilize the nutator displacement angle ($\phi_N$) as a persistent external excitation.

* * * * *